(12) United States Patent
Soderlund et al.

(10) Patent No.: US 9,636,791 B2
(45) Date of Patent: May 2, 2017

(54) SETTING DEVICE, SETTING SYSTEM, TOOL HOLDING SYSTEM AND METHOD FOR SETTING AN AXIAL POSITION OF A COMPONENT

(75) Inventors: Jens Soderlund, Vadstena (SE); Conny Johansson, Sturefors (SE); Thomas Nyman, Norrkoping (SE)

(73) Assignee: ETP TRANSMISSION AB, Linkoping (SE)

( * ) Notice: Subject to any disclaimer, the term of this patent is extended or adjusted under 35 U.S.C. 154(b) by 1042 days.

(21) Appl. No.: 13/140,759

(22) PCT Filed: Dec. 19, 2008

(86) PCT No.: PCT/EP2008/068071
§ 371 (c)(1),
(2), (4) Date: Jun. 17, 2011

(87) PCT Pub. No.: WO2010/069404
PCT Pub. Date: Jun. 24, 2010

(65) Prior Publication Data
US 2011/0243679 A1    Oct. 6, 2011

(51) Int. Cl.
 *B23Q 3/18*     (2006.01)
 *B23Q 5/34*     (2006.01)
 (Continued)

(52) U.S. Cl.
CPC ............. *B23Q 3/18* (2013.01); *B23B 31/305* (2013.01); *B23Q 5/341* (2013.01); *B26D 7/2635* (2013.01);
(Continued)

(58) Field of Classification Search
CPC ..... B23B 31/404; B23B 31/36; B23B 31/028; B23B 31/00; B23B 31/001; B23B 31/002;
(Continued)

(56) References Cited

U.S. PATENT DOCUMENTS 3,105,731 A * 10/1963 Bertrang ................. G01P 1/125
116/301
3,178,739 A *  4/1965 Plummer et al. .............. 408/141
(Continued)

FOREIGN PATENT DOCUMENTS

| CN | 2047606 | 11/1989 |
|---|---|---|
| CN | 1057418 | 1/1992 |

(Continued)

OTHER PUBLICATIONS

Chinese Office Action for CN 200880132388.3, Issued Dec. 9, 2013, 7 Pages.
(Continued)

*Primary Examiner* — Sean Michalski
*Assistant Examiner* — Fernando Ayala
(74) *Attorney, Agent, or Firm* — Hultquist, PLLC; Steven J. Hultquist (57) ABSTRACT

A setting device for setting an axial position of a rotatable component having a base member, adapted to be arranged in an axially fixed manner, and at least two separate setting members, mechanically movable relative to the base member, each of which is arranged to provide a respective substantially axial movement transferrable to a respective portion of the component.

20 Claims, 6 Drawing Sheets

(51) Int. Cl.
*B26D 7/26* (2006.01)
*B27B 5/32* (2006.01)
*B23B 31/30* (2006.01)
*F16H 25/20* (2006.01)

(52) U.S. Cl.
CPC .......... *B27B 5/32* (2013.01); *B23B 2260/004* (2013.01); *F16H 25/20* (2013.01); *Y10T 409/303752* (2015.01); *Y10T 409/308176* (2015.01); *Y10T 409/308624* (2015.01)

(58) Field of Classification Search
CPC .............. B23B 31/003; B23B 31/1612; B23B 2260/0045; B23B 21/305; B23B 31/305; B23Q 3/186; B23Q 5/31; B23Q 5/341; B23Q 3/18; B26D 7/2635; B23D 47/02; B23D 47/025; B27B 5/32
USPC .......... 409/131, 218, 210; 209/210; 279/2.1, 279/2.19; 407/38, 33, 44, 45; 82/44; 51/168; 403/259, 131
See application file for complete search history.

(56) References Cited

U.S. PATENT DOCUMENTS

| | | | |
|---|---|---|---|
| 3,242,818 A | 3/1966 | Kastler | |
| 3,342,818 A * | 9/1967 | Schefczik | 544/245 |
| 3,717,912 A * | 2/1973 | Lahm | 29/39 |
| 3,884,091 A * | 5/1975 | Hay | 74/499 |
| 4,133,231 A | 1/1979 | Corona | |
| 4,220,064 A * | 9/1980 | Potter | B23D 19/06 403/350 |
| 4,244,248 A * | 1/1981 | Adell et al. | 82/169 |
| 4,287,794 A * | 9/1981 | Gaddy | 334/74 |
| 4,336,755 A * | 6/1982 | Liska | 101/248 |
| 4,547,997 A | 10/1985 | Kimmelaar et al. | |
| 4,809,465 A * | 3/1989 | Mushardt | B24B 45/00 451/340 |
| 4,955,744 A * | 9/1990 | Barth | B24B 45/006 403/259 |
| 5,107,737 A * | 4/1992 | Tagliaferri | B23B 31/40 144/218 |
| 5,215,507 A * | 6/1993 | Bonig | 475/331 |
| 5,258,675 A * | 11/1993 | Nelessen | 310/91 |
| 5,488,513 A * | 1/1996 | Tanaka | 359/699 |
| 6,192,585 B1 * | 2/2001 | Buchanan, Jr. | B21D 53/24 29/898.06 |
| 6,231,492 B1 * | 5/2001 | Graag | B65H 45/28 493/368 |
| 6,261,041 B1 * | 7/2001 | Nakamura | B24B 23/028 411/428 |
| 6,308,622 B1 * | 10/2001 | Steffen | B41F 13/16 101/248 |
| 6,984,947 B2 | 1/2006 | Sulik | |
| 7,343,841 B2 * | 3/2008 | Phillips | B23D 59/003 403/259 |
| 2001/0047919 A1 * | 12/2001 | Mayr | F16D 13/52 192/93 A |
| 2002/0194940 A1 * | 12/2002 | Seidl | F16D 7/00 74/89.16 |
| 2003/0015978 A1 | 1/2003 | Sulik | |
| 2003/0126935 A1 * | 7/2003 | Matzschker et al. | 74/335 |
| 2004/0107788 A1 * | 6/2004 | Kramer | 74/440 |
| 2006/0091618 A1 * | 5/2006 | Rosberg | B23B 31/1172 279/4.01 |
| 2007/0028742 A1 | 2/2007 | Mueller et al. | |
| 2008/0204905 A1 | 8/2008 | Mizuno et al. | |

FOREIGN PATENT DOCUMENTS

| | | |
|---|---|---|
| DE | 4430535 | 2/1996 |
| DE | 29711184 U1 | 8/1997 |
| EP | 0462322 | 12/1991 |
| EP | 0861996 | 9/1998 |
| GB | 540609 | 10/1941 |
| WO | 9900604 A1 | 1/1999 |
| WO | 02096599 A1 | 12/2002 |
| WO | 2005009696 | 2/2005 |
| WO | 2005110649 A1 | 11/2005 |
| WO | 2007032730 A1 | 3/2007 |

OTHER PUBLICATIONS

International Search Report and Written Opinion for PCT/EP2008/068071, Both Completed by the European Patent Office on Oct. 7, 2009, All together 16 Pages.
Extended European Search Report for EP 13183336.0, Completed by the European Patent Office, Dated Nov. 21, 2013, 5 Pages.
Office Action for CN 200880132388.3, English Translation attached to original, Issued on Apr. 15, 2013, All together 14 Pages.

\* cited by examiner (Prior art) *Fig. 1a*

SETTING DEVICE, SETTING SYSTEM, TOOL HOLDING SYSTEM AND METHOD FOR SETTING AN AXIAL POSITION OF A COMPONENT

TECHNICAL FIELD

The present disclosure relates to a setting device for setting an axial position of at least one component, such as a rotary tool or tool part.

BACKGROUND

In some machining applications, rotary tools, such as saw blades or milling cutters are used to provide a profile, such as e.g. a groove, a tongue or a strip having a desired cross section shape. One example of such applications is the machining of mechanical locking systems for building panels, such as wall, roof, ceiling or floor panels.

In order to connect a rotary tool to a drive axle or driven axle of a machine, a clamping device, providing a connection between the rotary tool or tool part and the axle may be provided. Non-limiting examples of such clamping devices are hydraulic, mechanical or hydromechanical clamping devices made according to the basic principles disclosed in e.g. WO2007032730A1, WO2005110649A1 or WO9900604A1.

The clamping device may be arranged as a sleeve between the axle and the tool or tool part, and caused to simultaneously or selectively contract radially to clamp the sleeve to the axle, and expand radially to clamp the tool to the sleeve.

An axial position of the rotary tool or tool part may be fixed by clamping tool or tool part between a fixed flange, which may form part of the sleeve and a setting device, which may be arranged to provide an axial clamping force acting between the setting device and the flange. By providing a resilient element to act e.g. between the flange and the tool or tool part, an axial position of the tool may be set by moving the setting device axially.

The function of the setting device may be both to set the tool or tool part to a very precise axial position, and/or to allow for adjustment of the tool or tool parts to compensate for tool wear or to reposition the tool or tool part.

It is known to provide a setting device in the form of a thread on the sleeve, which thread cooperates with an internally threaded ring, which acts directly or indirectly on the tool or tool part. By rotating the ring, the axial position of the tool or tool part may be manipulated.

Figure 1A:
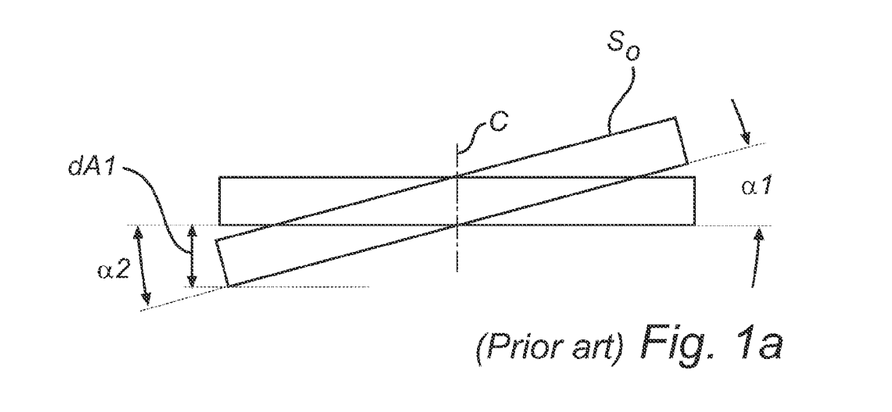
FIG. 1a schematically illustrates the problem of a setting device connected to a clamping device via a thread that is concentric with the clamping device.

A basic problem with this solution is illustrated in FIG. 1a, which schematically illustrates, in an exaggerated manner, a thread connection having an angular error or angular play represented by the angle $\alpha 1$. At the outer periphery of the nut S0, this angle $\alpha 1$ will translate to an axial deviation dA1. The axial deviation may cause incorrect axial positioning of the tool and/or it may cause the tool to be obliquely positioned relative to the axle.

Yet another problem with prior art setting devices is the fact that dust and debris may affect the operability of the thread, especially when a high precision thread is being used.

WO02096599A1 discloses a method and a device for setting a rotary tool, wherein a tool or tool part is axially clamped between a flange and a setting device. The setting device comprises a base part which is fixed relative to a mounting sleeve, and an internally threaded ring which is connected to the base part via a thread connection. The second part is arranged to act on the tool or tool part to provide axial setting of the tool or tool part position.

WO9900604A1 discloses a hydraulic clamping device, wherein a tool or tool part is axially clamped between a flange and a setting device. The setting device comprises an internally threaded ring, which is arranged in an outer thread on the clamping device, and which is provided with a locking device for preventing the threaded ring from moving relative to the tool or tool part, e.g. as a consequence of the its inertia when the tool is caused to rotate. The locking device comprises a ring which is fixedly connected to the tool or tool part, and which is connected to the setting device by a number of individually operable screws.

The solutions of WO02096599A1 and WO9900604A1 both suffer from the drawback illustrated with respect to FIG. 1a.

As the need for precise machining increases, there is a need for a setting device, which provides a decreased angular and/or axial deviation, and thus more precise setting.

SUMMARY

A general objective of the present disclosure is to provide a setting device for a component, which enables increased accuracy in the setting and positioning of the component. Preferably, such a setting device should also be easy to operate, in order to reduce setting times.

According to a first aspect, there is provided a setting device for setting an axial position of a rotatable component. The setting device comprises a base member, adapted to be arranged in an axially fixed manner, and at least two separate setting members. The setting members are mechanically movable relative to the base member, and arranged to provide a respective substantially axial movement transferrable to a respective portion of the component.

The respective axial force may be positive, i.e. in the form of a compressive force pressing on the component; or it may be negative, i.e. in the form of a tension force pulling on the component.

The component portions may be situated at a distance from the central axis of the component, and possibly closer to a periphery of the component than to its centre.

A component may be a tool, a tool part, a work piece, or any other product or device that is to be axially clamped or otherwise held in a precise axial position.

The movement may be transferred by the setting member itself or via one or more intermediate components.

The term "mechanically movable" means that the movement of the setting member is based on interaction between substantially rigid bodies, as opposed to the case where the movement of the setting member would be pneumatically or hydraulically induced.

Such a setting device has particular utility in connection with a rotating tool or tool part as described above. However, the setting device may be used in any application wherein an axial position of an arbitrary component is to be set, and/or wherein an axial clamping force is to be provided. The setting device may be used to set an axial position along an elongate device, such as an axle, rail or beam. Its use is thus not limited to any particular shape of cross section.

The setting members may be axially movable relative to the base member.

At least one of the setting members may be movable relative to the base member by a thread arrangement.

Hence, a rotating motion imparted to the setting member may be translated into an axial movement towards of away from the component.

As an alternative, at least one of the setting members may be movable relative to the base member by a cam arrangement.

At least one of the setting members may be slidingly movable relative to the base member.

At least one of the setting members is rotatable relative to the base member. Hence, the setting member may be caused to interact directly or indirectly with the component through a thread or cam connection In one embodiment, at least one of the setting members comprises a part protruding from the base member towards an intended position of the component. The protruding part may be provided with a cam or thread arrangement, which may directly or indirectly engage the component to provide either a compressive or tensile force.

In another embodiment, at least one of the setting members is arranged for interaction with a part protruding from the component or an intermediate member towards the setting device. The setting member may be arranged for interaction with the component or intermediate member by a cam or thread arrangement to provide either a compressive or tensile force.

The setting members may be arranged to transfer the respective movement over a transfer area having an extent which is only a portion of that of the setting device, both in a radial direction and in a rotational direction.

Hence, the setting members, may be essentially smaller than the the component. Hence, they may be arranged to operate as far away as possible from the axle centre. Each setting member may thus be arranged to provide the axial movement to a component portion which is limited both in a radial direction and in a rotational direction.

With smaller setting members, it is also easier to provide encapsulation thereof, which will reduce the risk of failure or malfunction due to dust and debris getting trapped in e.g. thread connections.

There is also provided a setting system comprising a setting device as claimed in any one of the preceding claims, and a synchronization mechanism, arranged to synchronize the axial movements provided by the setting members.

By providing a plurality of setting members, which move in a synchronized manner, it is possible to provide a more accurate setting device.

The synchronization mechanism may comprise a gear arrangement.

For example, the setting members may be interconnected by a belt drive or gear wheel.

Alternatively, the synchronization mechanism may comprise a friction connection.

For example, the setting members may be interconnected by a friction belt or wheel.

The synchronization mechanism may comprise a cam arrangement.

For example, a cam groove or cam surface may be rotatable relative to the base member.

In such a cam arrangement, each setting member may be movable relative to a cam groove or cam surface.

Alternatively, the setting members may be fixedly interconnected.

In the setting system, the setting device and the synchronization mechanism may form an integrated component.

In the alternative, the setting device and the synchronization mechanism may form separate components, which are interconnectable to provide synchronized setting of the axial movements.

According to a second aspect, there is provided a tool holding system comprising an abutment, configured to be fixed or fixable relative a drive or driven machine axle at a first axial side of the tool or tool part, and a setting device as described above, the setting device being fixable relative to the axle at a second axial side of the tool or tool part.

The tool holding system may comprise a clamping device, arranged for fixating at least one of the abutment, and the setting device relative to the axle.

The tool holding system may further comprise a resilient element, which is positionable to bias the tool or tool part against the setting device.

According to a third aspect, there is provided a method for setting an axial position of a component. The method comprises fixating an abutment relative to an axle, rail or beam; providing a setting device as described above; fixating the setting device relative to the axle, rail or beam, such that the abutment and the setting device are positioned at opposite axial sides of the component; providing a resilient element to bias the component to or from the setting device; and applying a respective substantially axial movement on a respective portion of the component.

The component may be a tool or a tool part, and wherein the abutment and setting device may be fixed relative to a drive or driven axle of a machine.

According to a fourth aspect, there is provided a setting system comprising a setting device for setting an axial position of a component and a a synchronization mechanism. The setting device comprises a base member, adapted to be arranged in an axially fixed manner, and at least two separate setting members, mechanically movable relative to the base member, each of which being arranged to provide a respective substantially axial movement movement transferrable to respective portion of the component. The synchronization mechanism is arranged to synchronize the axial movements provided by the setting members.

The setting device and the synchronization mechanism may form an integrated component.

The device and the synchronization mechanism may also form separate components, which are interconnectable to provide synchronized setting of the axial movements.

DETAILED DESCRIPTION

A setting device and system will now be described in more detail, with reference to their application to a rotary tool part. It is recognized that the principles described below are equally applicable to use of the setting device or setting system in non-rotary applications, and in applications where other objects than tools or tool parts are to be used.

Figure 1B:
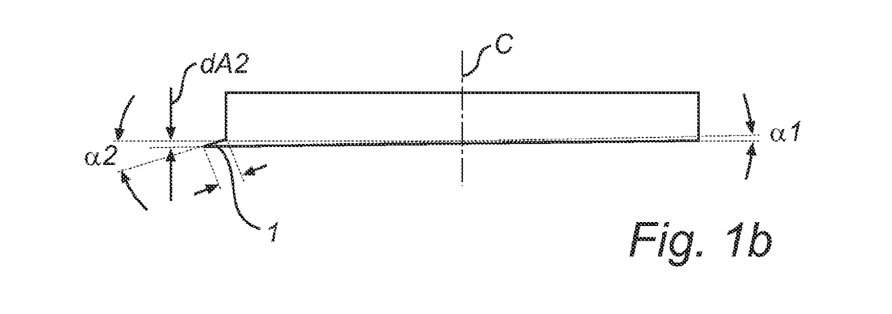
FIG. 1b schematically illustrates the effect achievable with the setting device of the present disclosure.
Figure 1C:
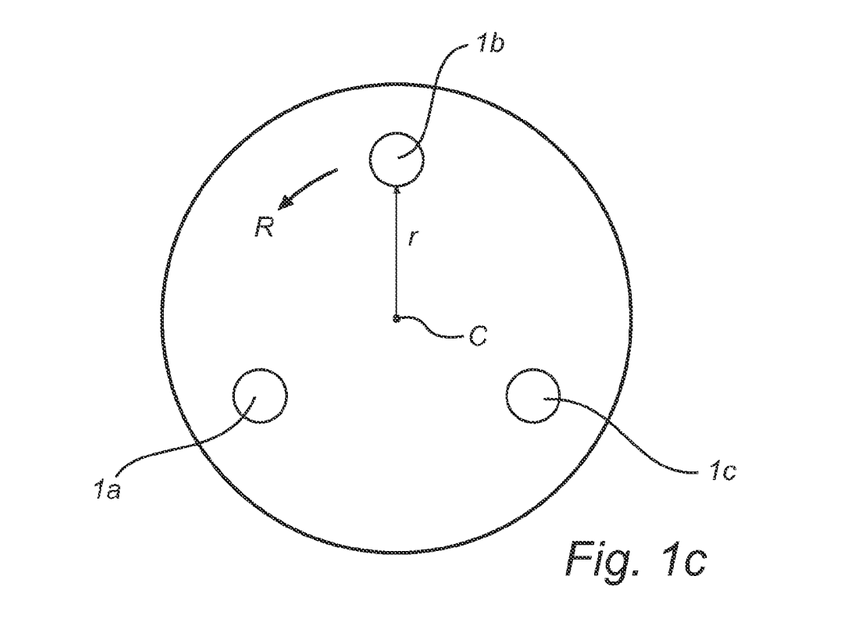
FIG. 1c illustrate reference directions used in the present disclosure.

Referring to FIG. 1b, the effect achievable with the present setting device will be briefly described. By arranging a plurality of synchronized setting members 1 spaced from a geometric centre C of the setting device, it is possible to make each setting member 1 much smaller than if it has to be in the form of a threaded ring acting concentrically with the tool holder. With a smaller setting member, an angular deviation α2 of the same magnitude as indicated in FIG. 1a will translate into a much smaller axial deviation dA2.

Furthermore, by arranging the setting members 1 spaced, and preferably as far as possible, from the geometric centre C of the setting device, the leverage of each individual angular deviation dA2 will be reduced.

Figure 2:
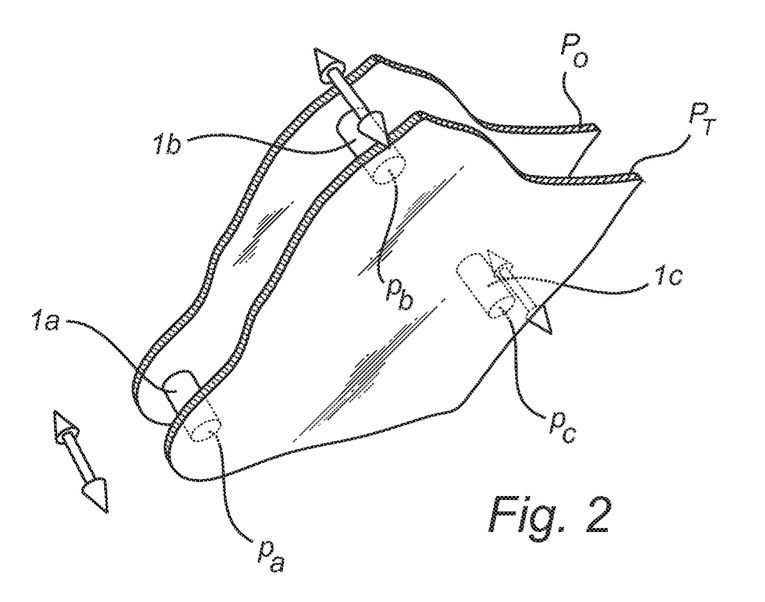
FIG. 2 schematically illustrates the basic principle of the setting device of the present disclosure.

FIG. 2 schematically illustrates a principle of the present disclosure. Basically, an axial force between a reference plane $P_0$ provided by the setting device and a tool plane $P_T$ may be transferred by at least two axially movable setting members 1a, 1b, 1c. The setting members thus provide a respective force on a respective portion $p_a$, $p_b$, $p_c$ of the tool. Each of the setting members provides substantially a point force, i.e. a force which is transferred by an area which is relatively small both in a radial direction r and in a rotational direction R.

Each setting member 1a, 1b, 1c may have a radial extent in a plane parallel with the reference plane $P_0$ or the tool plane $P_T$ that is smaller than an extent of the clamping device in that plane or smaller than an extent of the drive or driven axle A. Effectively, the setting members 1a, 1b, 1c may provide point contacts or close to point contacts, each of which is spaced from a geometric centre C of the setting device.

The setting members 1a, 1b, 1c may be situated as far away as possible from the center C, in one embodiment closer to an outer periphery of the setting device than to the center C.

Figure 3A:
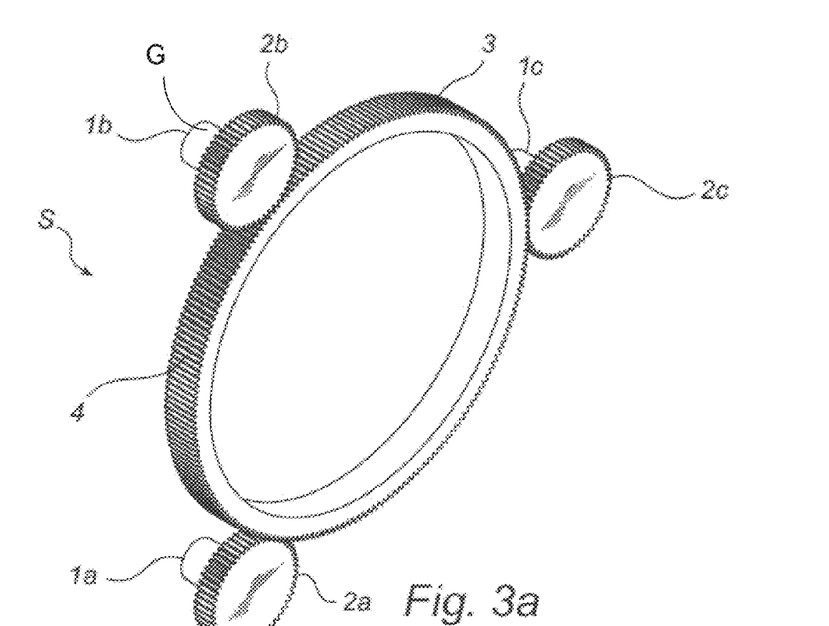
FIGS. 3a-3e schematically illustrate different embodiments of the synchronization mechanism.

FIG. 3a schematically illustrates a first embodiment of a synchronization mechanism. In this embodiment, each setting member 1a, 1b, 1c is provided with a threaded connection G (FIG. 4) with the base member 20 (FIG. 4), such that a rotation of the setting member relative to the base member 20 will cause the setting member 1a, 1b, 1c to move axially.

The synchronization mechanism may comprise a respective gear wheel 2a, 2b, 2c associated with each setting member 1a, 1b, 1c and a synchronization gear wheel 3, which in the illustrated example may be a ring having external teeth 4. Hence, rotation of the synchronization gear wheel 3, or of any of the setting members 1a, 1b, 1c will cause all setting members to rotate and thus to move in a synchronized manner relative to the base member 20.

Figure 4:
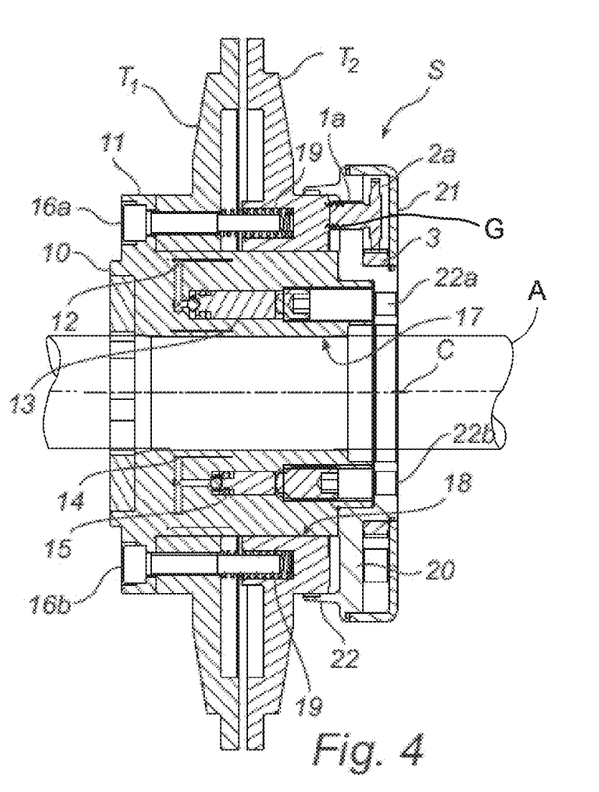
FIG. 4 schematically illustrates a tool holding system with a tool mounted therein.

The ring 3 may be provided as a separate part, which may be rotatably mounted in the base member, see FIG. 4. In this embodiment, rotation incurred onto one of the setting members will be transferred to the other setting members 1a, 1b, 1c.

Alternatively, the ring 3 may be integrated with a cover 21 or operating member (not illustrated), such that turning the cover or operating member relative to the base member 20 will cause rotation of the setting members 1a, 1b, 1c.

The synchronization gear wheel may also be provided as a ring 3 having internal teeth (not shown), analogously with what was described above, i.e. either in the form of a separate part or integrated with a cover or operating member.

Figure 3B:
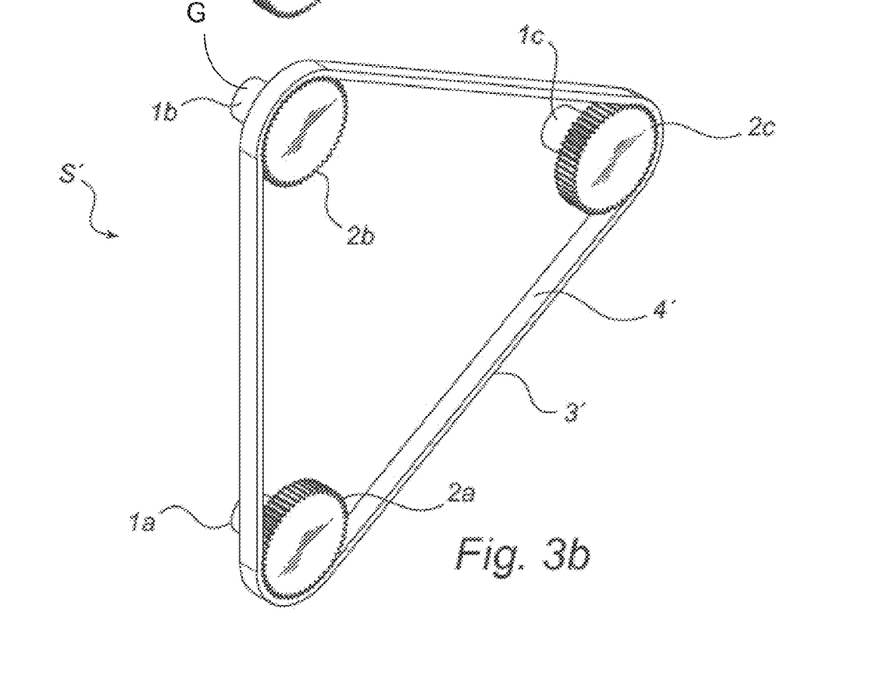

FIG. 3b schematically illustrates another embodiment, which resembles the one in FIG. 3a, but where the synchronization is provided by a geared belt drive 3' interacting with respective gear wheels 2a, 2b, 2c associated with the setting members 1a, 1b, 1c.

Figure 3C:
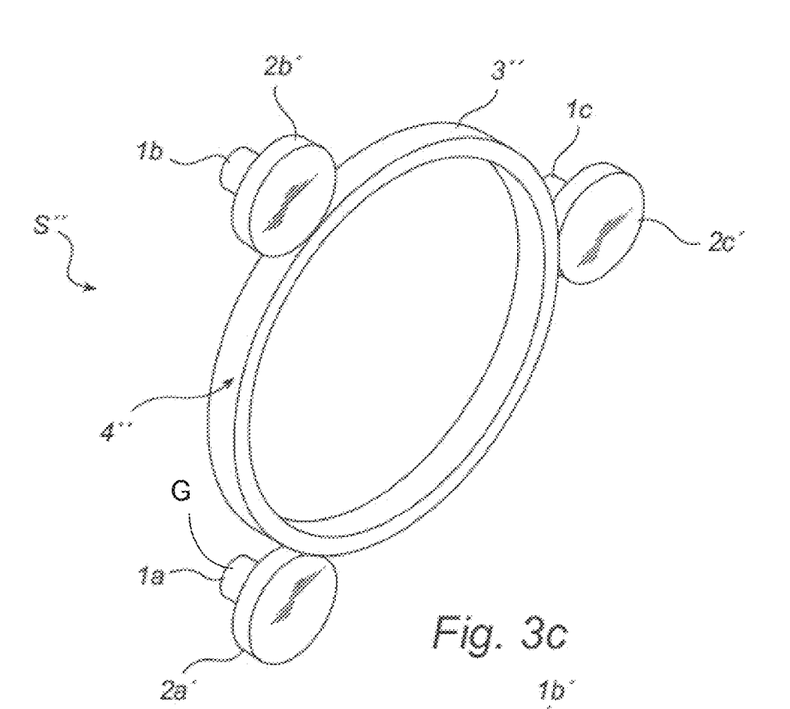

FIG. 3c schematically illustrates an embodiment wherein each setting member 1a, 1b, 1c is provided with a threaded connection G (FIG. 4) with the base member 20, such that a rotation of the setting member 1a, 1b, 1c relative to the base member 20 will cause the setting member to move axially, and wherein the synchronization is provided by a friction coupling. A respective friction wheel 2a', 2b', 2c' is associated with each setting member and the synchronization member may, analogously with FIGS. 3a and 3b, be a friction ring 3'' or a friction belt. The friction wheels and/or the synchronization member (e.g. at 4'') may be provided with a friction enhancing surface layer.

Figure 3D:
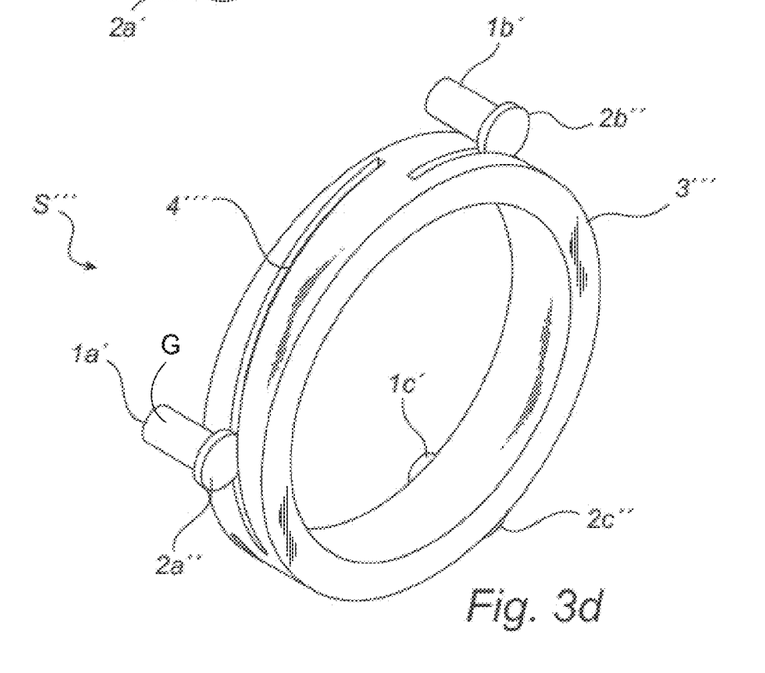
Figure 3E:
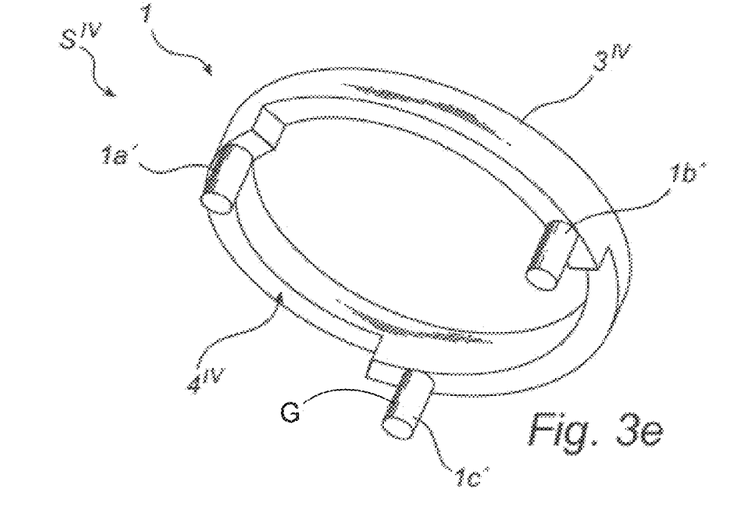

FIGS. 3d and 3e illustrate embodiments wherein the setting members 1a', 1b', 1c' are axially slidingly interconnected with the base member 20. Hence, each setting member may be able to slide axially relative to the base member.

In the embodiment of FIG. 3d, each setting member is associated with a cam follower 2a'', 2b'', 2c'', and the synchronization member 3''' is in the form of a ring having at least one cam surface 4'''. In the illustrated example, the cam surface is arranged in a cam groove, extending in an outwardly oriented surface of the ring 3'''.

However, the cam groove may, alternatively, extend in an inwardly or axially oriented surface of the ring 3'''.

FIG. 3e schematically illustrates an embodiment wherein the setting members 1a', 1b', 1c' are fixedly connected to a first synchronization member $3^{IV}$. The synchronization member has an axially oriented cam surface $4^{IV}$, which is intended to interact with a non-illustrated cam follower, that may be arranged on the base member 20. The synchronization member may be biased towards the cam follower by e.g. a resilient element.

In the alternative, the cam surface may be arranged on the base member, and the cam follower may be arranged on the synchronization member.

Fig. schematically illustrates sectional a view of a tool holding system comprising a clamping device 10, an abutment flange 11 or collar, a setting device S and a tool set comprising first and second tool parts $T_1$, $T_2$.

The clamping device is here in the form of a hydraulic clamping device having an inner pressure chamber 14, which may be activated and deactivated by a first piston arrangement 13, pressurization of which causes an inner sleeve to contract radially inwardly and clamp the clamping device 10 relative to an axle A encircled by it, in a per se known manner. The clamping device thus has an inwardly oriented surface 17, which engages an axle by friction.

The clamping device may further comprise an outer pressure chamber 12, which may be activated and deactivated by a second piston arrangement 15, pressurization of which causes an outer sleeve to expand radially outwardly and clamp the tool parts to the clamping device, in a per se known manner. The clamping device thus has an outwardly oriented surface 18, which engages a tool or tool part by friction.

Access to the piston arrangements 13, 15 may be provided through recesses or holes 22a, 22b in the setting device S.

A first tool part $T_1$ may be fixedly connected to the abutment flange 11, e.g. by means of a number of screws 16a, 16b or bolts. A resilient element 19, here in the form of a helical spring, may be arranged to act between the first and second tool parts, so as to bias them away from each other.

A base part 20 of the setting device S may be fixedly connected to the clamping device 10. The setting device may be provided with through holes allowing access to activation screws for the pressure chambers.

The setting device may be provided with a cover part 21, providing a housing for the synchronization mechanism. The setting device may further have at least one collar 22 extending axially from the base member and providing a sealed space between the setting device and a tool part, in which the setting members may operate.

Referring to FIG. 4, the setting members 1a, 1b, 1c may act directly upon a tool part. However it is also possible for it to operate on an intermediate part, such as a spacing element etc.

Figure 5A:
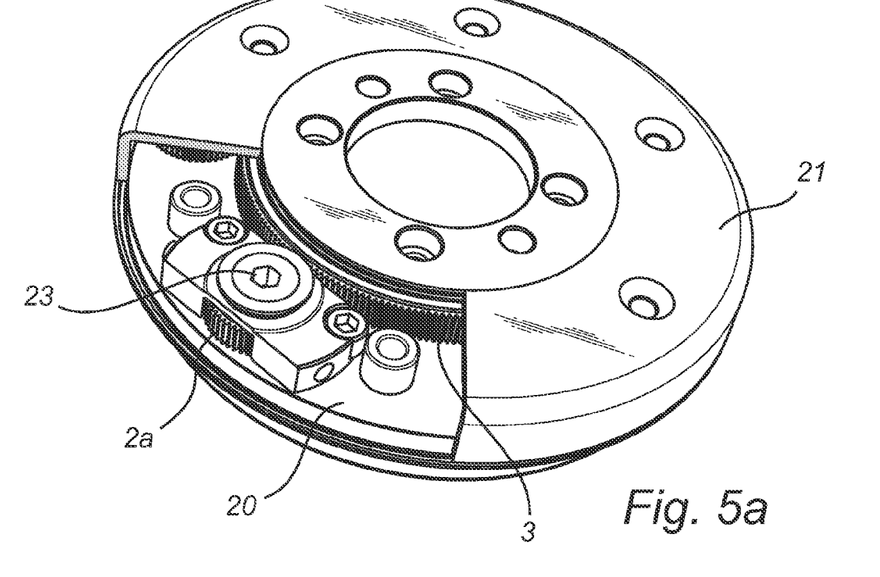
FIGS. 5a-5b schematically illustrate an embodiment of the setting device.
Figure 5B:
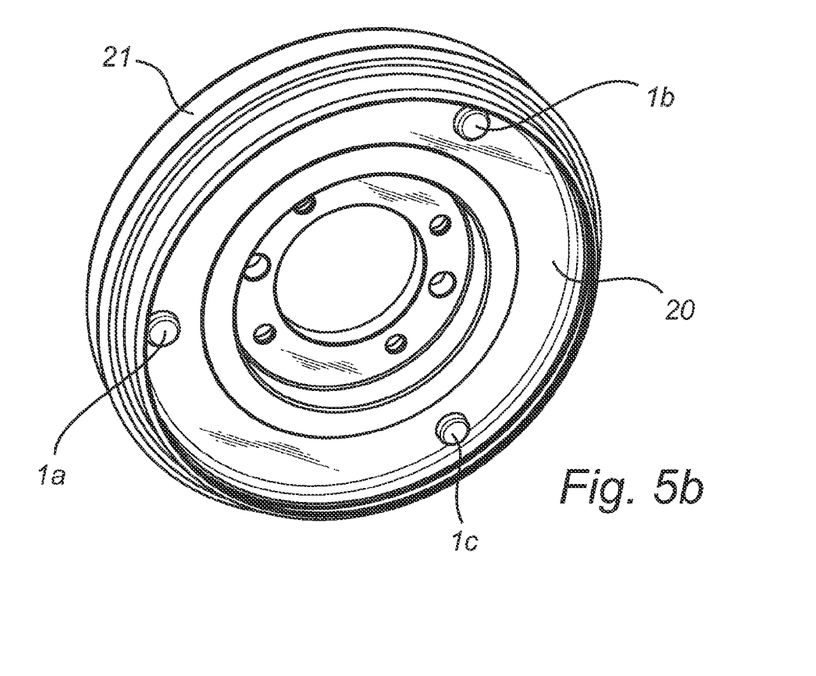

FIGS. 5a and 5b are perspective views of an embodiment of the setting device.

In FIG. 5a, a part of the cover member 21 is cut away, thus revealing one of the gear wheels 2a associated with a setting member 1a and a part of the synchronization gear wheel 3. In this embodiment, the cover is fixed relative to the base member 20, and setting of the device may be achieved by engaging an screw head 23, e.g. a socket head cap screw, as illustrated in FIG. 5a.

In the embodiments using gear wheels, it is possible to provide a stepping mechanism (not shown), to provide for stepwise adjustability. Such a mechanism may be provided by a spring-loaded ball, which is arranged to act upon one of the gear wheels.

FIG. 5b illustrates the rear side of the setting device, where the setting members are clearly visible.

Referring to FIGS. 4, 5a and 5b, a tool holding system may be operated as follows.

A clamping device 10 is attached to an axle A, e.g., by pressurising an annular gap 14 between an innermost sleeve and an outer sleeve. The pressurisation may be achieved by tightening a piston 15 in a per se known manner.

A tool comprising first $T_1$ and second $T_2$ tool parts may be arranged concentrically with the axle A and the clamping device 10. The first tool part $T_1$ is rigidly attached to a flange 11 of the clamping device 10 by screws 16a, 16b. The second tool part $T_2$ is biased away from the first tool part and from the flange 11 by one or more springs 19. A base member 20 of a setting device S is rigidly attached to the clamping device 10 by screws (not shown).

Setting members 1a, 1b, 1c protruding from the base member of the setting device are arranged to bear on the second tool part $T_2$.

By the action of the springs 19, the second tool part $T_2$ is biased towards the setting members 1a, 1b, 1c of the setting device 10.

By manipulating the screw head 23, and through the action of the gear wheel, setting members 1a, 1b, 1c are caused to rotate in a synchronized manner. Through the threaded interaction G between the setting members 1a, 1b, 1c and the base member 20, the rotating motion of the setting members 1a, 1b, 1c is translated into an axial movement causing the setting members 1a, 1b, 1c, and thus the second tool part $T_2$, to move towards or from the flange 11.

In a non-illustrated embodiment, the setting members may be provided with a cam or thread arrangement at its distal part, which may be arranged to interact with a corresponding cam follower or thread of the tool or of an intermediate device.

While the setting members herein are illustrated as protrusions from the base member, it should be recognized that the setting members need not protrude from the base member at all. Instead, the setting member may be arranged to move at least partially inside the base member, whereby it may interact with a protrusion or pin arranged on the tool or on an intermediate device.

The movement of the setting member may be at least partially (e.g. by a thread connection) axial, in which case the axial movement may be directly transferred to the component.

Alternatively, the movement of the setting member may be purely rotational, in which case a thread or cam connection with a protrusion or pin of the component or intermediate device may be provided.

In an integrated setting device with protruding setting members, it is possible to provide accuracy by post-assembly grinding of the setting members, such that they provide a well-defined plane.

In an alternative embodiment, a setting device may be provided, wherein the setting members are individually movable, without any built-in synchronization mechanism. In such an embodiment, it may be necessary adjust each setting member individually. In such an embodiment, each setting member may be provided with a respective stepping mechanism, as described above.

Thus, synchronized setting may be provided by the user noting the number of "clicks" each setting member is turned. Such a setting device being individually adjustable may be advantageous since it allows for compensation of angular deviations. In the alternative, the synchronized setting may be provided by an indicating device, indicating the respective rotary or angular position of the each setting member.

When using a setting device with individually adjustable setting members, it is also possible to provide a separate synchronization tool, which may be arranged to simultaneously engage all setting members and provide a synchronized adjustment of them. Referring to FIGS. 5a, 5b, the synchronization gear wheel, with a suitable user interface (grip) may be provided as the synchronization tool.

It is also conceivable to provide the synchronization by means of one or more electric motors or other types of actuators. Such motor or actuator could be arranged to act upon the ring 3, 3", 3"', $3^{Iv}$ or belt 3' of FIGS. 3a-3e. It would also be possible to provide a separate motor for each setting member, in which case individual or synchronized adjustment would be possible, depending on how the motors are operated.

A setting device intended for use in a rotary machine, e.g. with a rotary tool or tool part, may need to be provided with a balancing arrangement, to counteract or eliminate vibrations when the setting device is caused to rotate.

The setting device may include two or more, e.g. three, four, five, six, etc. setting members, which may or may not be synchronized or synchronizable.

The invention claimed is:

1. A tool holding system comprising:
   at least one tool or tool part,
   a drive or driven axle,
   a hydraulic clamping device, arranged on said axle and comprising a pressure chamber, pressurization of which causes an outer sleeve of the clamping device to expand radially outwardly to clamp the tool or tool part to the axle,
   an abutment configured to be fixed to the axle at a first axial side of the tool or tool part;
   a setting device including a base configured to be fixed on a second axial side of the tool or tool part and at least two separate setting members extending through the base and engagable with the tool,
   wherein the setting members are axially moveable to provide axial movement to respective different portions of the tool to adjust an axial position of the tool relative to the setting device when the hydraulic clamping device is in a non-clamping state; and a synchronization mechanism disposed in the setting device and connected to the setting members to synchronize the axial movements of the setting members.

2. The system of claim 1 further comprising a clamping device attachable to the driven axle, wherein the abutment is connected to a first end of the clamping device.

3. The system of claim 2 wherein the base of the setting device is connectable to a second end of the clamping device.

4. The system of claim 1 further comprising a resilient element positionable to bias the tool against the setting device, such that the setting members are axially moveable against said bias to provide axial movement to respective different portions of the tool to adjust an axial position of the tool relative to the setting device when the hydraulic clamping device is in a non-clamping state.

5. The system of claim 1 wherein at least one of the setting members is movable relative to the base by a thread or cam arrangement.

6. The system of claim 1 wherein at least one of the setting members is slidably movable relative to the base.

7. The system of claim 1 wherein at least one of the setting members is rotatably movable relative to the base.

8. The system of claim 1 wherein at least one of the setting members is arranged for interaction with a part protruding from the tool or an intermediate member towards the setting device.

9. The system of claim 8 wherein the setting members are arranged for interaction with the tool or intermediate member by a cam or thread arrangement.

10. The system of claim 1 wherein the setting members are arranged to transfer the axial movement over a transfer area having an extent, both in a radial direction and in a rotational direction, which is only a portion of that of the setting device.

11. The system of claim 1 wherein the setting device and the synchronization mechanism form an integrated component.

12. The system of claim 1 wherein each of the setting members includes threads that are engageable with a threaded hole defined in the tool, wherein rotation of the setting members causes movement of the tool due to cooperation of the threads.

13. A tool holding system comprising:
first and second tool parts,
a drive or driven axle,
a hydraulic clamping device, arranged on said axle and comprising a pressure chamber, pressurization of which causes an outer sleeve of the clamping device to expand radially outwardly to clamp the tool or tool part to the axle,
a hydraulic clamping device attachable to the axle and including a first end having an abutment and a second end;
the first tool part attachable to the abutment between the first and second ends;
a setting device including a base attachable to the second end, at least two separate setting members each having a portion that extends through the base towards the abutment, and a synchronization mechanism connected to each of the setting members and arranged to synchronize movement of the setting members; and
the second tool part slidably received on the hydraulic clamping device between the first tool part and the base when the hydraulic clamping device is in a non-clamping state, and connected to the setting members of setting device, wherein the setting members are axially moveable to provide axial movement to respective different portions of the second tool part to adjust a position of the second tool relative to the setting device.

14. The system of claim 13 wherein the fixture is a clamping device.

15. The system of claim 13 wherein the synchronization mechanism is a gear and each of the setting members includes teeth the mesh with the gear.

16. The system of claim 13 wherein the synchronization mechanism is disposed on a side of the base opposite the second tool.

17. A tool holding system comprising:
a drive or driven axle,
a hydraulic clamping device, arranged on said axle and comprising a pressure chamber,
a tool slidably received on the hydraulic clamping device, wherein pressurization of the pressure chamber causes an outer sleeve of the clamping device to expand radially outwardly to clamp the tool or tool part to the axle; and
a setting device including a base attachable to an end of the hydraulic clamping device, at least two setting members each having a portion that extends through the base and is connectable to the tool, and
a synchronization mechanism connected to each of the setting members to synchronize movement of the setting members,
wherein the setting members are axially moveable to provide axial movement to respective different portions of the tool to adjust a position of the tool relative to the setting device, when the hydraulic clamping device is in a non-clamping state.

18. The system of claim 17 wherein the fixture is a clamping device.

19. The system of claim 17 wherein the synchronization mechanism is disposed on a side of the base opposite the tool.

20. The system of claim 17 wherein the synchronization mechanism is a gear and each of the setting members includes teeth the mesh with the gear.

* * * * *